Feb. 7, 1961 F. C. LORNITZO 2,970,612
VALVE
Filed Aug. 19, 1959 2 Sheets-Sheet 1

INVENTOR.
FRANK C. LORNITZO
BY
Arthur H. Seidel
ATTORNEY

INVENTOR.
FRANK C. LORNITZO
BY
ATTORNEY

United States Patent Office 2,970,612
Patented Feb. 7, 1961

2,970,612
VALVE

Frank C. Lornitzo, Pawtucket, R.I., assignor to Pantex Manufacturing Corp., Pawtucket, R.I., a corporation of Delaware Filed Aug. 19, 1959, Ser. No. 834,756

19 Claims. (Cl. 137—620)

The present invention relates to a valve, and more particularly to a control valve for controlling the operation of a pneumatically operated device.

For controlling the operation of pneumatically operated devices, such as air cylinders or the like, it is desirable to have a control valve which can be easily opened and closed, and which when opened will stay opened until intentionally closed. Also, the valve should be capable of exhausting the device being controlled. In addition, the valve should be operable either manually and/or automatically. For controlling dangerous devices, it is desirable to have a valve which cannot be accidentally opened.

It is an object of the present invention to provide a novel valve.

It is another object of the present invention to provide a novel valve for controlling the operation of a pneumatically operated device.

It is still another object of the present invention to provide a valve for operating pneumatically operated devices which is capable of exhausting the device.

It is a further object of the present invention to provide a valve which can be manually and/or automatically operated.

It is a still further object of the present invention to provide a valve which cannot be accidentally opened.

Other objects will appear hereinafter.

For the purpose of illustrating the invention there is shown in the drawings forms which are presently preferred; it being understood, however, that the present invention is not limited to the precise arrangements and instrumentalities shown.

Figure 1:
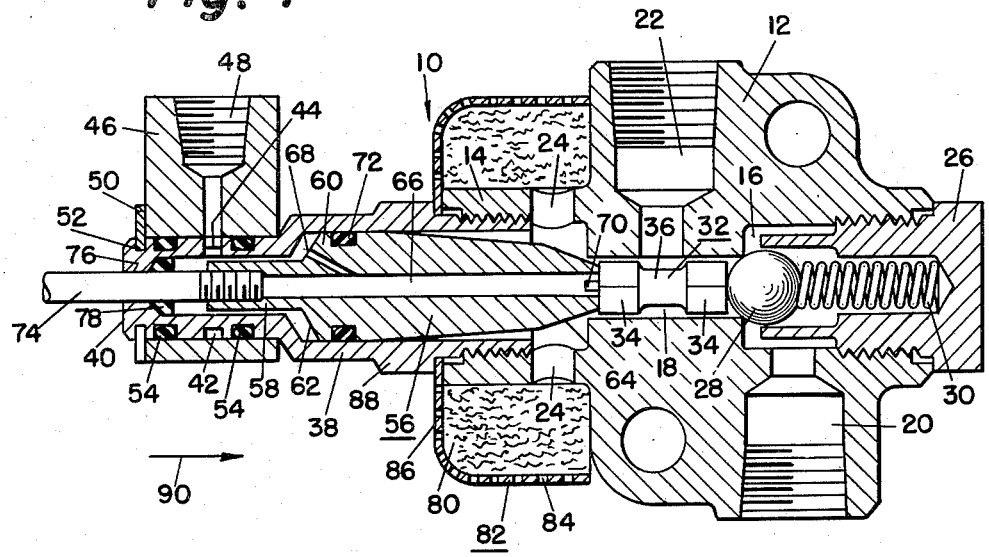
Figure 1 is a sectional view of a valve of the present invention in closed disposition.

Referring initially to Figure 1, the valve of the present invention is generally designated as 10.

Valve 10 comprises a body 12 having a cylindrical sleeve 14 integral with and extending from one end of the body 12. Valve body 12 has a cylindrical recess 16 in its end opposite the sleeve 14, which recess 16 is in alignment with the interior of the sleeve 14. A passageway 18 extends through the body 12 between the recess 16 and the interior of the sleeve 14. Passageway 18 is smaller in diameter than the diameter of the recess 16 and the interior of the sleeve 14. Inlet port 20 and outlet port 22 extend through the body 12 from opposite sides of the body 12. Inlet port 20 opens into the recess 16, and outlet port 22 opens into the passageway 18. Sleeve 14 has a plurality of exhaust openings 24 therethrough adjacent the body 12.

A thimble 26 is threaded into the recess 16, and extends substantially the full length of the recess 16. A metal ball 28 is provided in the open end of the thimble 26. Ball 28 is of a diameter larger than the diameter of the passageway 18. A helical spring 30 is within the thimble 26, and is compressed between the ball 28 and the bobbin of the thimble 26. Spring 30 urges the ball 28 into the end of the passageway 18. Since the ball 28 is larger in diameter than the diameter of the passageway 18, the ball 28 will firmly seat in the end of the passageway 18 to close the path between the inlet port 20 and the outlet port 22.

A spacer 32 is slidably disposed within the passageway 18. Spacer 32 has end portions 34 which are square in transverse cross-section, and a cylindrical intermediate portion 36 connecting the end portions 34. The diameter of the intermediate portion 36 is smaller than the thickness of the end portions 34 to provide an annular space between the intermediate portion 36 and the wall of the passageway 18. Since the end portions 34 of the spacer 32 are square in transverse cross-section, and the passageway 18 is circular in transverse cross-section, there is provided space between the flat surfaces of the end portions 34 and the wall of the passageway 18.

A cylinder 38, which is open at one end, has its open end threadedly secured in the sleeve 14 of the body 12. Cylinder 38 has a reduced diameter closed end portion 40. The closed end portion 40 of the cylinder 38 has an annular groove 42 in its outer surface, and an opening 44 extending radially from the groove 42 to the interior of the cylinder 38. A fitting 46 is swivelly mounted around the closed end portion 40 of the cylinder 38. Fitting 46 has a port 48 therethrough which extends to the annular groove 42 in the closed end portion 40 of the cylinder 38. A C-shaped retaining ring 50 is disposed within an annular groove 52 in the end of the closed end portion 40 to secure the fitting 46 on the closed end portion 40. A pair of packing rings 54 are disposed between the closed end portion 40 of the cylinder 38 and the fitting 46 on opposite sides of the annular groove 42.

A valve stem 56 is slidably disposed within the cylinder 38. Valve stem 56 has an end portion 58 which is slidably disposed in the closed end portion 40 of the cylinder 38. The end portion 58 of the valve stem 56 is of a diameter smaller than the internal diameter of the closed end portion 40 of the cylinder 38. The portion 60 of the valve stem 56 adjacent the end portion 58 is cylindrical and of a diameter substantially equal to the internal diameter of the cylinder 38. A tapered shoulder 62 is provided between the end portion 58 and the cylinder portion 60 of the valve stem 56. Valve stem 56 has a slight taper from the cylindrical portion 60 to a tip 64. The tip 64 of the valve stem 56 tapers to a diameter smaller than the diameter of the passageway 18 in the valve body 12. Valve stem 56 has a central passageway 66 extending longitudinally therethrough, and a port 68 extending from the passageway 66 to the shoulder 62. A pair of diametrically opposed recesses 70 are provided in the end of the tip 64 of the valve stem 56. The recesses 70 extend from the outer surface of the tip 64 and the passageway 66. A packing ring 72 is provided between the cylindrical portion 60 of the valve stem 56 and the inner surface of the cylinder 38.

A rod 74 extends through a hole 76 in the closed end of the cylinder 38, and is threadably secured in the end portion 58 of the valve stem 56. The rod 74 closes the end of the passageway 66 in the valve stem 56. A gasket 78 is within the closed end portion 40 of the cylinder 38 and surrounds the rod 74 to seal the hole 76.

An annular ring 80 of felt or other porous material surrounds the sleeve 14 of the valve body 12. The annular ring 80 is contained within a cup-shaped retainer 82. Retainer 82 is provided with a plurality of holes 84 therethrough. The base 86 of the retainer 82 has a central hole therethrough through which the cylinder 38 extends, and the base 86 of the retainer 82 is clamped between a flange 88 on the cylinder 38 and the end of the sleeve 14.

The valve 10 of the present invention operates as follows:

The inlet port 20 is connected to a source of gas under pressure, and the outlet port 22 is connected to the pneumatic device to be operated; assuming first that the port 48 in the fitting 46 is closed, either by a plug, or by a closed valve.

Figure 2:
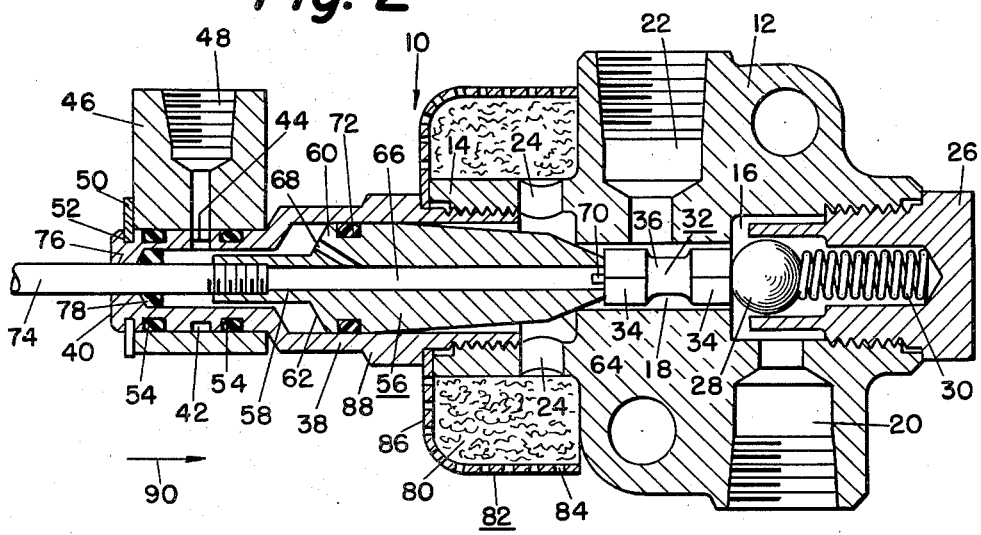
Figure 2 is a sectional view of the valve shown in Figure 1 in opened disposition.

The valve 10 is opened manually by pushing the rod 74 inwardly in the direction of arrow 90 in Figure 1. This moves the valve stem 56 toward the ball 28 until the tip 64 of the valve stem 56 is seated tightly in the end of the passageway 18 to close the end of the passageway 18 as shown in Figure 2. The spacer 32 is of a length that the valve stem 56 engages the spacer 32 and moves the spacer 32 against the ball 28. This moves the ball 28 against the spring 30 and out of the end of the passageway 18 to open the path between the inlet port 20 and the outlet port 22 as shown in Figure 2. Thus, the gas under pressure entering the inlet port 20 can pass through the recess 16, and the passageway 18 to the outlet port 22.

Since the tip 64 of the valve stem 56 is within the passageway 18, some of the gas will flow through the recesses 70 in the tip 64 of the valve stem 56 into the passageway 66. The gases entering the passageway 66 and the valve stem 56 will flow through the passageway 66 and the port 68 into the portion of the cylinder 38 between the shoulder 62 of the valve stem 56 and the closed end of the cylinder 38. The area of the shoulder 68 of the valve stem 56 is larger than the area of the tip 64 of the valve stem 56 which is within the passageway 18. Thus, the gas pressure force acting upon the shoulder 62 of the valve stem 56 is greater than the gas pressure force acting upon the tip 64 of the valve stem 56. The area of the shoulder 62 of the valve stem 56 is sufficiently greater than the area of the tip 64 within the passageway 18 that the gas pressure force acting upon the shoulder 62 is greater than the gas pressure force on the tip 64 plus the force of the spring 38. Thus, the valve 10 of the present invention is maintained open.

To manually close the valve 10 of the present invention, the rod 74 is pulled outwardly in the direction opposite to the arrow 90 in Figure 1. This moves the valve stem 56 away from the spacer 32, and permits the spring 30 to re-seat the ball 28 in the end of the passageway 18. The seating of the ball 28 in the end of the passageway 18 stops the flow of the gas from the inlet port 20 to the outlet port 22. The movement of the valve stem 56 away from the spacer 32 also unseats the tip 64 of the valve stem 56 from the end of the passageway 18. This opens the path between the outlet port 22 to the exhaust openings 24 in the sleeve 14. Since the exhaust openings 24 are open to the atmosphere, the gas in the pneumatic device being controlled by the valve 10, which is at a pressure greater than atmospheric, will flow back through the outlet port 22 and through the exhaust openings 24. The felt ring 80 and the retainer 82 permit the escape of the gas, but silences the noise of the escaping gas. Since the area of the valve stem 56 which is exposed to the exhausting gas is at least equal to the area of the valve stem 56 which is exposed to the gas in the closed end portion 40 of the cylinder 38, the force of the exhausting gas on the valve stem 56 plus the force of the spring 30 will hold the valve stem 56 back to maintain the valve 10 closed. Also, the gas in the closed end portion 40 of the cylinder 38 will flow back through the valve stem port 68 and the passageway 66, and will exhaust through the exhaust openings 24. Thus, the gas pressure on the shoulder 62 of the valve stem 56 is reduced so that the spring 30 will hold the valve stem 56 back.

The valve 10 can be closed automatically by opening the port 48 in the fitting 46. This permits the gas within the back end portion 40 of the cylinder 38 to escape through the opening 44 and the port 48. Since the opening 44 and the port 48 are larger in diameter than the valve stem port 68 and the recesses 70 in the tip 64 of the valve stem 56, the gas will escape from the closed end portion 40 faster than gas will re-enter the closed end portion 40 through the passageway 66 in the valve stem 56. Thus, the gas pressure on the shoulder 62 of the valve stem 56 will decrease sufficiently so that the gas pressure on the tip 64 of the valve stem 56 plus the pressure of the spring 30 will move the valve stem 56 back in the direction opposite to the arrow 90, and re-seat the ball 28 in the end of the passageway 18. Thus, the valve 10 is closed, and the valve 10 will exhaust the gas in the device being operated in the manner as previously described.

The valve 10 of the present invention can also be opened automatically by connecting the port 48 of the fitting 46 to a source of gas under pressure. Thus, the valve 10 can be opened by admitting gas under pressure into the closed end portion 40 of the cylinder 38 through the port 48 of the fitting 46. The gas entering the closed end portion 40 of the cylinder 38 will act on the valve stem 56 to move the valve stem 56 in the direction of arrow 90, and thereby open the valve 10 in the manner as previously described. Once the valve 10 is opened, the gas passing from the inlet port 20 to the outlet port 22 will maintain the valve 10 open in the manner as previously described. The valve 10 can then be closed either by opening the port 48 of the fitting 46 to the atmosphere to permit the gas within the closed end portion 40 of the cylinder 38 to escape, or by manually pulling the rod 74 in the direction opposite to the arrow 90. Since the valve 10 can be opened automatically by pneumatic pressure, a plurality of the valves 10 can be connected in series or sequence operation of the valves 10. By connecting the port 48 of the fitting 46 of a second valve 10 to the outlet port 22 of a first valve 10, when the first valve 10 is opened, either manually or automatically, the gas flowing from the outlet port 22 of the first valve 10 will enter the closed end portion 40 of the cylinder 38 of the second valve 10 through the port 48 of the fitting 46 to automatically open the second valve 10. In the same manner a third valve 10 can be connected either to the first valve or to the second valve for automatic operation of the third valve. When the first valve 10 is opened, and the gas which had passed through the outlet port 22 of the first valve 10 is exhausted through the exhaust openings 24, the second and third valves will be automatically closed.

Figure 3:
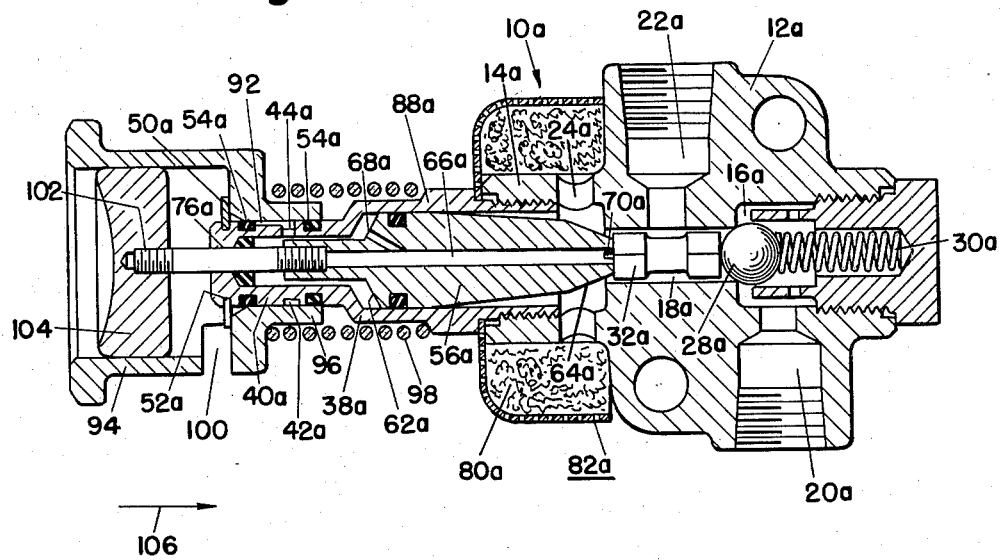
Figure 3 is a sectional view of the modification of the valve of the present invention in closed disposition.
Figure 4:
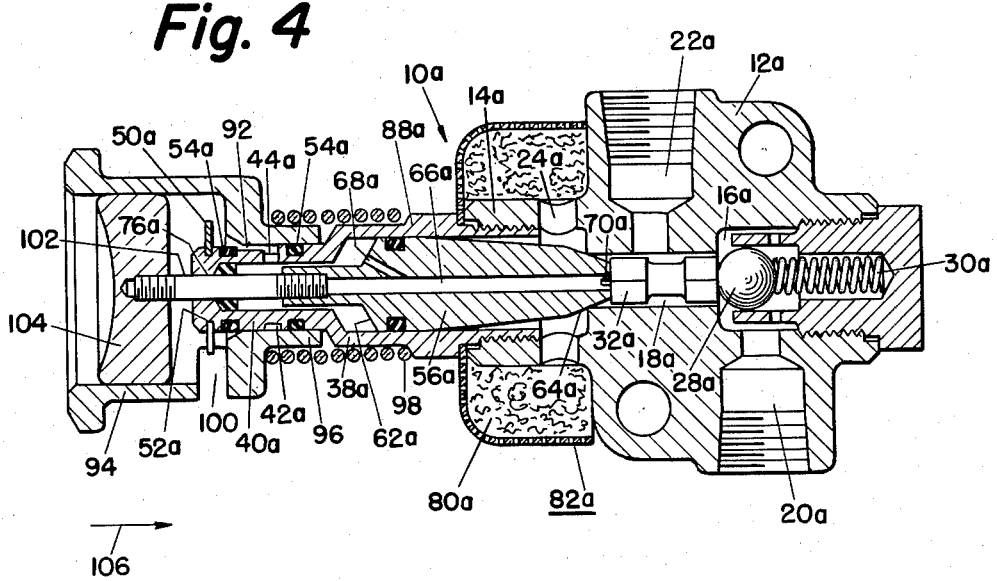
Figure 4 is a sectional view of the valve shown in Figure 3 in opened disposition.

Referring to Figures 3 and 4, a modification of the valves of the present invention is generally designated as 10a.

Valve 10a comprises a valve body 12a which is identical to the body 12 of valve 10 shown in Figures 1 and 2. Valve body 12a has an inlet port 20a which is in communication with an outlet port 22a through a recess 16a and a passageway 18a. A ball 28a is held seated in the end of the passageway 18a by the spring 30a.

A cylinder 38a is threadably secured in the sleeve 14a of the valve body 12a. Cylinder 38a has a reduced diameter closed end portion 40a. The closed end portion 40a of the cylinder 38a has an annular groove 42a in its outer periphery, an opening 44a extending from the interior of the closed end portion 40a to the annular groove 42a, and a groove 92 extending longitudinally from the annular groove 42a toward the closed end of the cylinder 38a.

A valve stem 56a is slidably disposed within the cylinder 38a. Valve stem 56a is of a construction identical to the valve stem 56 of the valve 10 shown in Figures 1 and 2. A spacer 32a is disposed between the tip 64a of the valve stem 56a and the ball 28a. Spacer 32a is identical to the spacer 32 of the valve 10 shown in Figures 1 and 2.

A cup 94 has an annular sleeve 96 extending longitudinally from the bottom of the cup 94. The sleeve 96 of the cup 94 is slidably disposed around the closed end portion 40a of the cylinder 38a. The closed end portion 40a of the cylinder 38a is provided with a pair of packing rings 54a at opposite sides of the annular groove 42a, which packing rings 54a sealingly engage the inner surface of the sleeve 96 of the cup 94. A C-shaped retainer ring 50a is disposed within an annular groove 52a in the closed end of the cylinder 38a to retain the cup 94 on the cylinder 38a. A helical spring 98 surrounds the cylinder 38a and is compressed between the cup 94 and a flange 88a of the cylinder 38a. The spring 98 normally holds the cup 94 against the retainer ring 50a. Cup 94 is provided with an opening 100 through its side wall adjacent the bottom of the cup 94.

A rod 102 extends through a hole 76a in the closed end of the cylinder 38a, and is threadably secured in the valve stem 56a. A button 104 is slidably disposed within the cup 94, and is threadably secured to the end of the rod 102. The rod 102 closes the back end of the passageway 66a in the valve stem 56a.

The valve 10a of the present invention operates as follows:

To open the valve 10a, button 104 is pushed inwardly with respect to the cup 94 in the direction of arrow 106 until the tip 64a of the valve stem 56a is seated tightly in the end of the passageway 18a in the valve body 12a. This also moves the ball 28a out of the passageway 18a to permit the gas to flow from the inlet port 20a to the outlet port 22a. As in the valve 10 shown in Figures 1 and 2, some of the gas passing to the outlet port 22a of the valve 10a passes into the passageway 66a in the valve stem 56a through the recesses 70a in the tip 64a of the valve stem 56a. The gas passing through the passageway 66a of the valve stem 56a flows through the port 68a in the valve stem 56a into the closed end portion 40a of the cylinder 38a. Such gases acting upon the shoulder 62a of the valve stem 56a maintains the valve 10a open. The opening 44a through the closed end portion 40a of the cylinder 38a is sealed closed by the sleeve 96 of the cut 94 and the packing rings 54a.

To close the valve 10a, the cup 94 is pushed forward with respect to the button 104 in the direction of arrow 106 to the position shown in Figure 4. This forward movement of the cup 94 uncovers the longitudinal groove 92 in the closed end portion 40a of the cylinder 38a so that the interior of the closed end portion 40a of the cylinder 38a is in communication with the atmosphere through the hole 44a, the annular groove 42a, the groove 92, and the opening 100 in the cup 94. Thus, the gas within the closed end portion 40a of the cylinder 38a is permitted to escape to the atmosphere so that the pressure acting on the shoulder 62a of the valve stem 56a is reduced. With the reduction of the pressure acting upon the shoulder 62a of the valve stem 56a, the pressure acting on the tip 64a of the valve stem 56a plus the force of the spring 30a is sufficient to move the valve stem 56a back in the direction opposite to the arrow 106. Thus, the ball 28a is reseated in the end of the passageway 18a to close the path between the inlet port 20a and the outlet port 22a. At the same time, the tip 64a of the valve stem 56a is unseated from the end of the passageway 18a so that the outlet port 22a is in communication with the exhaust openings 24a in the sleeve 14a. The gas passing from the outlet port 22a to the exhaust openings 24a apply sufficient pressure to the tip of the vlave stem 56a to maintain the valve 10a closed.

Since it is necessary to push in on the button 104 without moving the cup 94 to open the valve 10a of the present invention, the valve 10a cannot be inadvertently opened by accidentally pressing against the cup 94 and the button 104. Thus, the valve 10a of the present invention has particular utility for controlling the operation of dangerous equipment. In addition, since the valve 10a is quickly and easily closed by merely pressing in on the cup 94, the operator of such dangerous equipment can quickly stop the operation of the equipment by merely pressing in on the cup 94 with his body or arm.

The present invention may be embodied in other specific forms without departing from the spirit or essential attributes thereof and, accordingly, reference should be made to the appended claims, rather than to the foregoing specification as indicating the scope of the invention.

I claim:

1. A valve comprising a body, a passageway in said body, an inlet port in said body in communication with one end of said passageway, an outlet port in said body opening into said passageway between the ends of said passageway, an exhaust opening through said body in communication with the other end of said passageway, a ball resiliently seated in the one end of said passageway to block the path between the inlet and outlet ports, a cylinder connected to said body adjacent the other end of said passageway and in alignment with said passageway, a valve stem slidably disposed within said cylinder, one end of said valve stem being adapted to seat in the other end of said passageway to block the path between the outlet port and the exhaust opening, a spacer member within said passageway between said valve stem and said ball, said spacer member being of a length so that when the valve stem is seated in the other end of the passageway the valve stem forces the spacer against the ball to unseat the ball from the one end of the passageway and thereby open the path between the inlet port and the outlet port, means utilizing line pressure in said valve body passageway for maintaining said valve end seated against said other end of said body passageway when said inlet port and said outlet port are in communication, and means for moving said valve stem toward and away from said passageway.

2. A valve in accordance with claim 1 in which the means utilizing line pressure includes a closed end on said cylinder at the end of the cylinder which is away from the passageway, sealing means is provided between the outer periphery of the valve stem and the interior surface of the cylinder, and the valve stem has a passageway therethrough, one end of said valve stem passageway being in communication with the valve body passageway and the other end of said valve stem passageway being in communication with the closed end of said cylinder.

3. A valve in accordance with claim 2 in which the means for moving the valve stem includes a rod secured to the other end of the valve stem and extending through the closed end of the cylinder.

4. A valve in accordance with claim 3 in which the cylinder has an opening therethrough adjacent the closed end of the cylinder.

5. A valve in accordance with claim 4 including a fitting around the cylinder adjacent the closed end of the cylinder, said fitting extending substantially radially outwardly from said cylinder and having a port therethrough which is in alignment with the opening through said cylinder.

6. A valve in accordance with claim 5 in which the cylinder has an annular groove in its outer surface, said groove extending across the opening in said cylinder, and the fitting is rotatably mounted on said cylinder.

7. A valve in accordance with claim 4 in which the cylinder has an annular groove in its outer surface; said annular groove extending across the opening in said cylinder, and a longitudinal groove in its outer surface extending from the annular groove toward the closed end of the cylinder, and a sleeve slidably disposed around said cylinder, said sleeve being slidable between a position in which the sleeve seals closed the opening through said cylinder and a position in which the opening in said cylinder is open to the atmosphere.

8. A valve in accordance with claim 7 in which the sleeve is secured to the botom of a cup which extends around and projects longitudinally beyond the closed end of the cylinder, and a button is slidably disposed within said cup and is secured to the rod which extends from the valve stem.

9. A valve in accordance with claim 8 including spring means engaging the cup and normally holding the sleeve in its position in which the opening in the cylinder is sealed closed by said sleeve.

10. A valve comprising a valve body, said body having a pair of longitudinally aligned recesses in opposite ends thereof and a passageway extending between the bottoms of said recesses, said passageway being smaller in diameter than the diameter of said recesses, said body having an inlet port extending therethrough to one of said recesses, an outlet port extending therethrough from said passageway, and an exhaust opening therethrough from said other recess, a ball in said one recess and adapted to seat tightly in the end of said passageway between the inlet port and the outlet port, a thimble secured in said one recess and closing the open end of said one recess, a spring between said thimble and said ball urging said ball toward said passageway, a cylinder secured in the open end of said other recess and extending longitudinally beyond said body, the outer end of said cylinder being closed, a valve stem slidably engaged with said cylinder, said valve stem having a tip at one end which is adapted to seat in the end of the passageway between the outlet port and the exhaust opening, a spacer member within said pasageway between the tip of said valve stem and said ball, said spacer member being of a length to engage both the tip end of the valve stem and the ball and to allow the ball and the valve stem to seat in the passageway only one at a time, and means for urging said valve stem toward and away from said passageway.

11. A valve in accordance with claim 10 including sealing means between the outer periphery of the valve stem and the interior surface of the cylinder, and a passageway extending longitudinally through said valve stem from the tip end of the valve stem, said valve stem passageway being in communication with the valve body passageway and with the closed end of the cylinder.

12. A valve in accordance with claim 11 in which the means for moving the valve stem includes a rod secured to the other end of the valve stem and extending through the closed end of the cylinder.

13. A valve in accordance with claim 12 in which the cylinder has an opening therethrough adjacent the closed end of the cylinder.

14. A valve in accordance with claim 13 including a fitting around the cylinder adjacent the closed end of the cylinder, said fitting extending substantially radially outwardly from said cylinder and having a port therethrough which is in alignment with the opening through said cylinder.

15. A valve in accordance with claim 14 in which the cylinder has an annular groove in its outer surface, said groove extending across the opening in said cylinder, and the fitting is rotatably mounted on said cylinder.

16. A valve in accordance with claim 12 in which the cylinder has an annular groove in its outer surface, said annular groove extending across the opening in said cylinder, and a longitudinal groove in its outer surface extending from the annular groove toward the closed end of the cylinder, and a sleeve is slidably disposed around said cylinder, said sleeve being slidable between a position in which the opening in said cylinder is sealed closed by said sleeve and a position in which the opening in said cylinder is open to the atmosphere.

17. A valve in accordance with claim 16 in which the sleeve is secured to the bottom of a cup which extends around and projects longitudinally beyond the closed end of the cylinder, and a button is slidably disposed within said cup and is secured to the rod which extends from the valve stem.

18. A valve in accordance with claim 17 including spring means engaging the cup and normally holding the sleeve in its position in which the opening in the cylinder is sealed closed by the sleeve.

19. A valve in accordance with claim 10 including a ring of porous material disposed around said valve body and extending across the exhaust opening, and a cup shaped body around said porous material, said cup shaped body having a base clamped between said cylinder and a portion of said valve body.

References Cited in the file of this patent

UNITED STATES PATENTS 2,426,941    Mercier _____ Sept. 2, 1947

FOREIGN PATENTS 528,440    Italy _____ Nov. 13, 1954